(12) United States Patent
Hashimoto et al.

(10) Patent No.: US 10,695,903 B2
(45) Date of Patent: Jun. 30, 2020

(54) ARTICULATED ROBOT AND MODULE THEREOF

(71) Applicant: KAWASAKI JUKOGYO KABUSHIKI KAISHA, Kobe-shi, Hyogo (JP)

(72) Inventors: Yasuhiko Hashimoto, Kobe (JP); Takahiro Inada, Kakogawa (JP); Kenji Bando, Nishinomiya (JP); Yoshiaki Tanaka, Akashi (JP); Junichi Murakami, Kobe (JP); Satoru Hibino, Kobe (JP); Yukio Iwasaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 192 days.

(21) Appl. No.: 15/539,951

(22) PCT Filed: Dec. 26, 2014

(86) PCT No.: PCT/JP2014/006491
§ 371 (c)(1),
(2) Date: Jun. 26, 2017

(87) PCT Pub. No.: WO2016/103301
PCT Pub. Date: Jun. 30, 2016

(65) Prior Publication Data
US 2017/0334064 A1    Nov. 23, 2017

(51) Int. Cl.
*B25J 9/04* (2006.01)
*B25J 9/06* (2006.01)
*B25J 9/08* (2006.01)

(52) U.S. Cl.
CPC ............... *B25J 9/06* (2013.01); *B25J 9/042* (2013.01); *B25J 9/08* (2013.01); *B25J 9/043* (2013.01)

(58) Field of Classification Search
CPC ........................................................ B25J 9/042
See application file for complete search history.

(56) References Cited

U.S. PATENT DOCUMENTS

| 5,042,774 | A | 8/1991 | Kakinuma |
| 6,484,067 | B1 * | 11/2002 | Kinoshita ............ B25J 19/0062 |
| | | | 277/534 |
| 7,597,025 | B2 | 10/2009 | Narita et al. |

(Continued)

FOREIGN PATENT DOCUMENTS

| CN | 103503127 A | * | 1/2014 |
| CN | 103503127 A | | 1/2014 |

(Continued)

OTHER PUBLICATIONS

Mar. 31, 2015 Search Report issued in International Patent Application No. PCT/JP2014/006491.

(Continued)

*Primary Examiner* — Gerald McClain
(74) *Attorney, Agent, or Firm* — Oliff PLC

(57) ABSTRACT

An articulated robot includes a pedestal and two or more modules supported by the pedestal. Each of the two or more modules includes a support member, a link member supported by the support member to be rotatable about a first axis, and a first drive unit provided in the link member and for rotating the link member about the first axis with respect to the support member.

4 Claims, 10 Drawing Sheets

(56) References Cited

U.S. PATENT DOCUMENTS

| | | | |
|---|---|---|---|
| 8,196,492 B1 * | 6/2012 | Denu | B25J 9/042 414/744.5 |
| 2006/0133918 A1 | 6/2006 | Akaha | |
| 2007/0020081 A1 | 1/2007 | Gilchrist et al. | |
| 2010/0178135 A1 | 7/2010 | Laceky et al. | |
| 2012/0141235 A1 | 6/2012 | Krupyshev et al. | |
| 2012/0232690 A1 | 9/2012 | Gilchrist et al. | |
| 2013/0170935 A1 * | 7/2013 | Kato | B25J 9/044 414/744.3 |
| 2014/0126987 A1 | 5/2014 | Gilchrist et al. | |

FOREIGN PATENT DOCUMENTS

| | | | |
|---|---|---|---|
| JP | S63-077674 A | | 4/1988 |
| JP | H02-198782 A | | 8/1990 |
| JP | H07-251389 A | | 10/1995 |
| JP | H07-276271 A | | 10/1995 |
| JP | 2699510 B2 | | 1/1998 |
| JP | H11-033949 A | | 2/1999 |
| JP | 2003-79961 A | | 3/2003 |
| JP | 2006-93710 A | | 4/2006 |
| JP | 2008-264980 A | | 11/2008 |
| JP | 2008264980 A | * | 11/2008 |
| JP | 2012-514544 A | | 6/2012 |
| JP | 2013-59857 A | | 4/2013 |
| JP | 2013-544034 A | | 12/2013 |
| KR | 10-1999-0039799 | | 6/1999 |
| KR | 10-0705143 | | 4/2007 |

OTHER PUBLICATIONS

Jun. 27, 2017 International Preliminary Report on Patentability issued in International Patent Application No. PCT/JP2014/006491.

Dec. 11, 2018 Office Action issued in Chinese Application No. 2014800843142.

Sep. 28, 2018 Extended European Search Report issued in European Patent Application No. 14 90 8912.

* cited by examiner

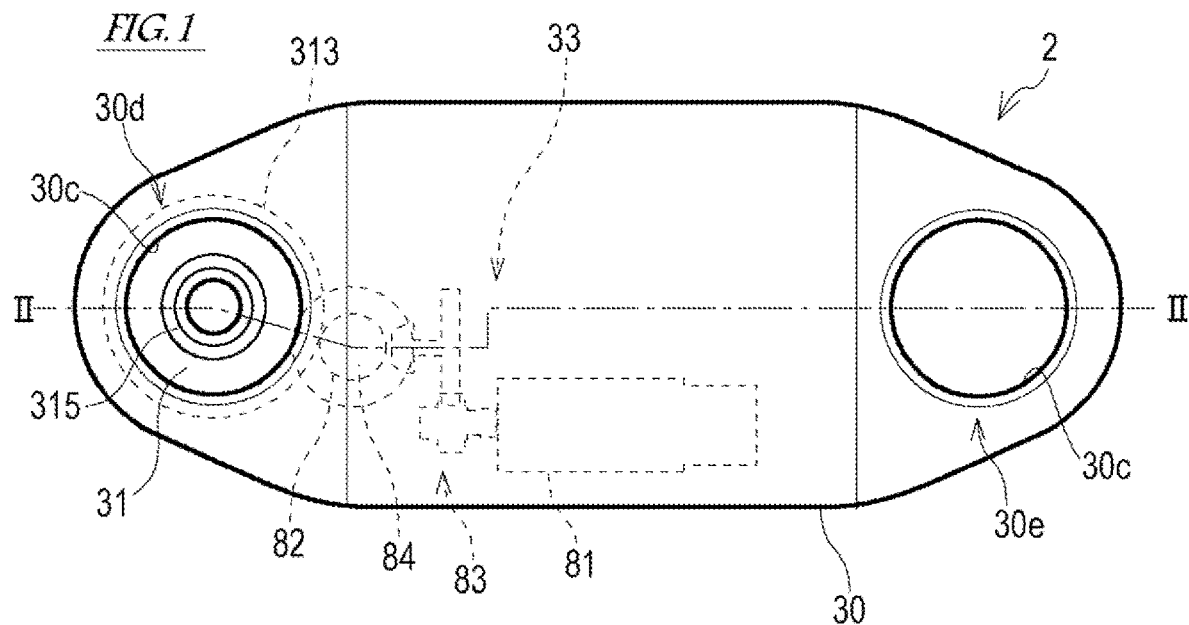
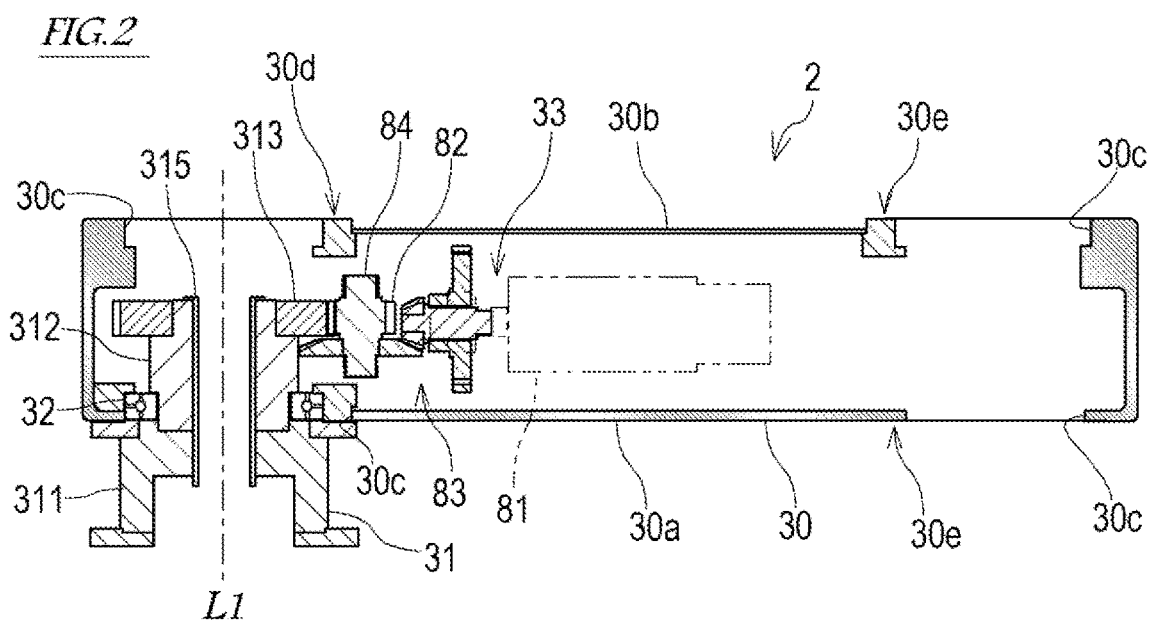

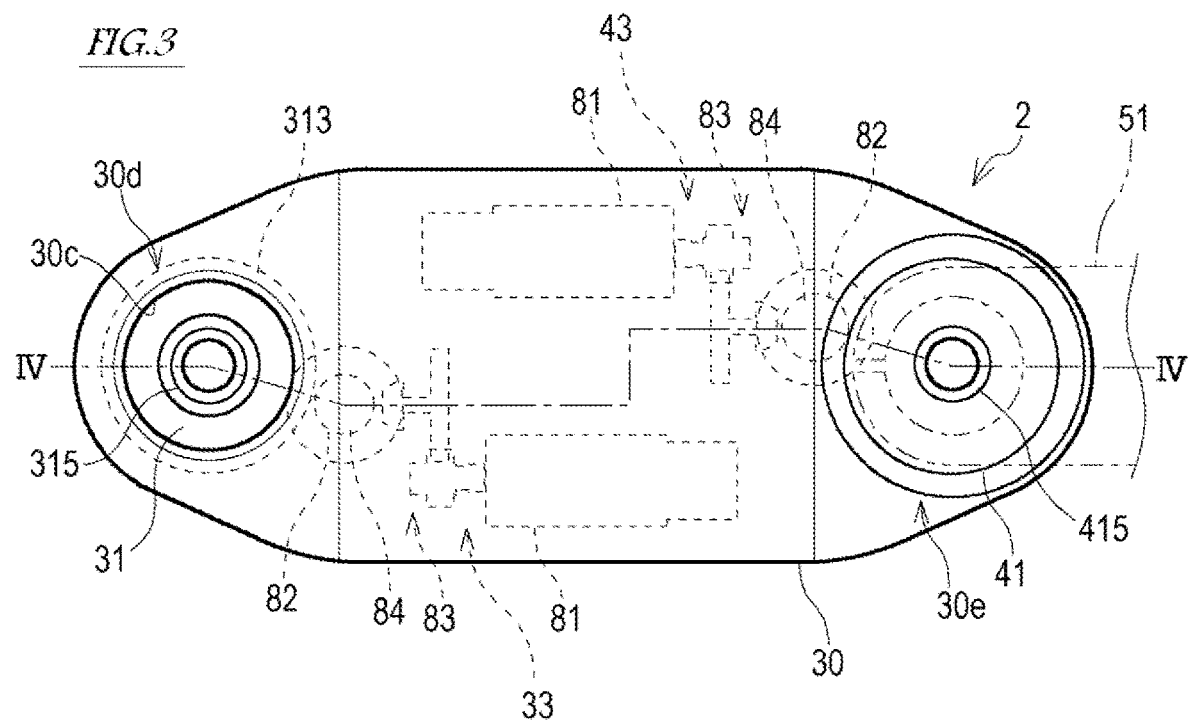
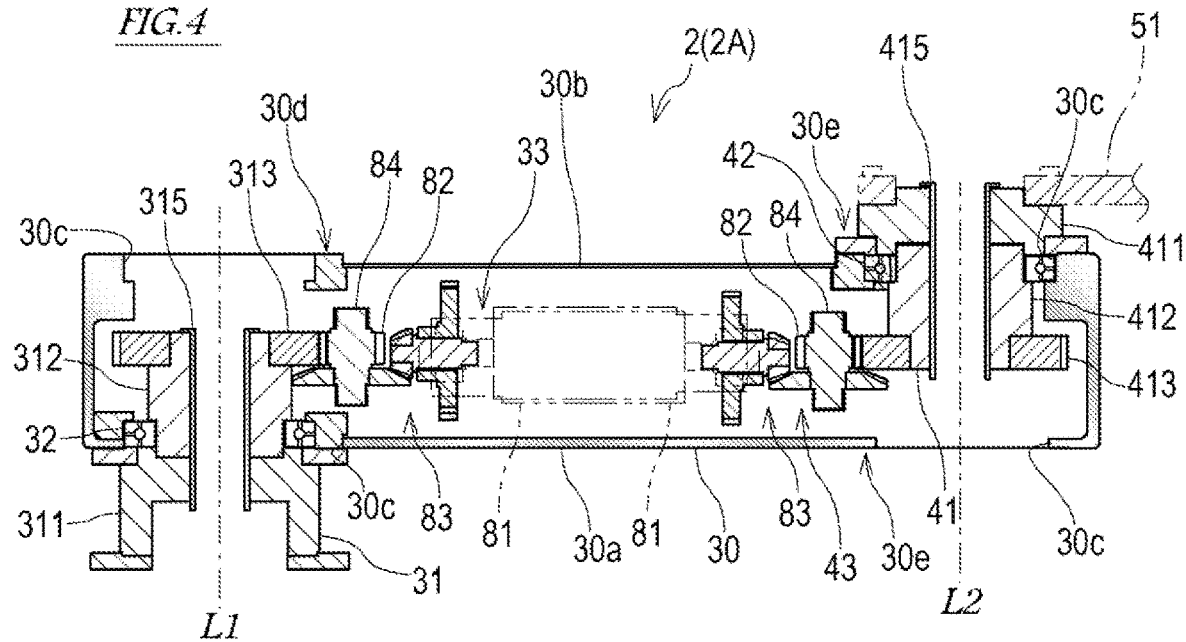

ARTICULATED ROBOT AND MODULE THEREOF

TECHNICAL FIELD

The present invention relates to an articulated robot and a module which forms at least one of links provided to this articulated robot.

BACKGROUND ART

Articulated robots formed by coupling a plurality of arm units are conventionally known. For example, Patent Document 1 discloses an articulated robot including a plurality of arm units. Each of the plurality of arm units is comprised of a circular cylindrical base shaft part having the same diameter as a pedestal, a first arm member coupled to the base shaft part to be rotatable via a ball bearing inside an arm placing groove of D-shape formed in the base shaft part, and a second arm member rotatably coupled to the first arm member. The base shaft part of one of the plurality of arm units is detachably joined to the base shaft part of another arm unit. According to this articulated robot, its effect of being a multi-arm robot including a plurality of arm units in basic, and also becoming a single-arm robot provided with only a single arm unit as needed is stated.

REFERENCE DOCUMENT OF CONVENTIONAL ART

Patent Document

[Patent Document 1] JP 1990-198782A

DISCLOSURE OF THE INVENTION

Problems to be Solved by the Invention

Although the articulated robot of Patent Document 1 can change the number of the arm units, it does not have flexibility to restructure the arm units themselves as needed.

SUMMARY OF THE INVENTION

In order to facilitate customization of the articulated robot, the inventors of the present application have come to modularize an articulated robot and achieved a construction of an articulated robot by combining a single module with a link member or combining two or more modules with each other as needed.

A module of an articulated robot according to one aspect of the present invention includes a support member, a link member supported by the support member to be rotatable about a first axis, and a first drive unit provided in the link member and for rotating the link member about the first axis with respect to the support member.

An articulated robot according to one aspect of the present invention includes a pedestal and two or more modules supported by the pedestal, each of the two or more modules including a support member, a link member supported by the support member to be rotatable about a first axis, and a first drive unit provided in the link member and for rotating the link member about the first axis with respect to the support member.

Effect of the Invention

According to the present invention, the articulated robot is capable of being constructed by combining one module with a link member or combining two or more modules with each other as needed.

BRIEF DESCRIPTION OF DRAWINGS

FIG. 1 is a plan view illustrating a schematic structure of a module of a standard specification.

FIG. 2 is a schematic view of the II-II cross section of FIG. 1.

FIG. 3 is a plan view illustrating a schematic structure of a module of an optional specification which corresponds to the standard specification with an additional shaft member.

FIG. 4 is a schematic view of the IV-IV cross section of FIG. 3.

MODES FOR CARRYING OUT THE INVENTION

Figure 5:
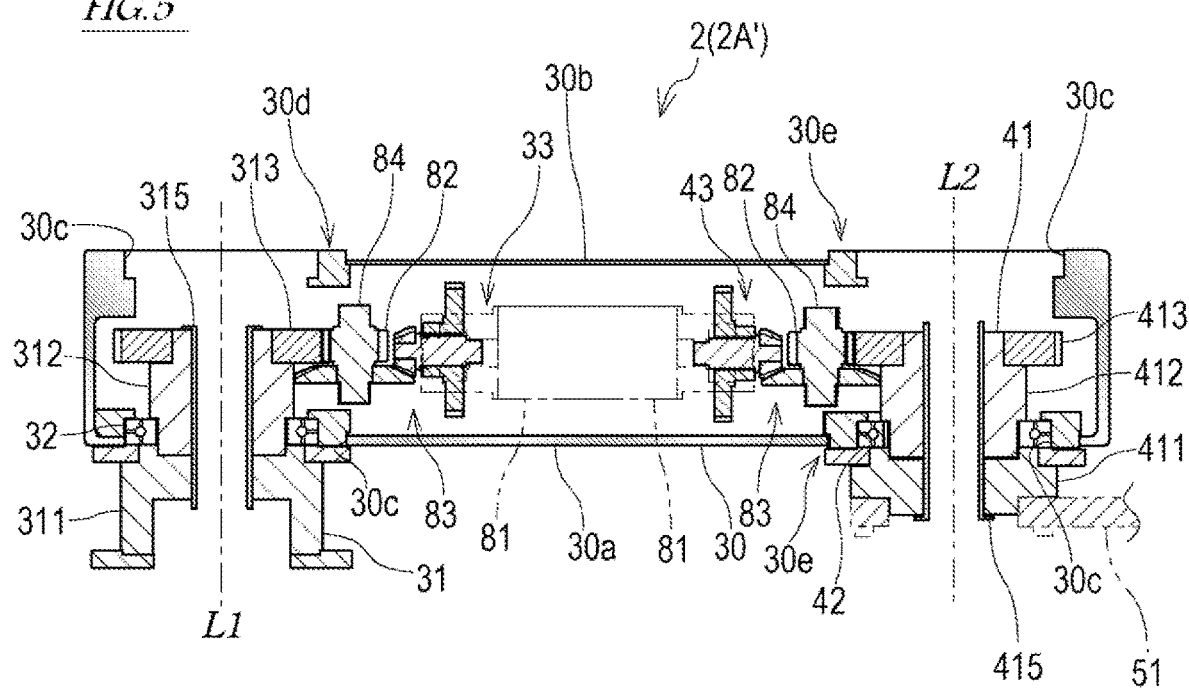
FIG. 5 is a side cross-sectional view illustrating one modification of the module of the optional specification illustrated in FIG. 3.

Next, embodiments of the present invention are described with reference to the accompanying drawings. Articulated robots according to the embodiments of the present invention are horizontally articulated robots including at least two links rotatably coupled to each other, and at least one of the at least two links is comprised of a module of one embodiment of the present invention. The module has a standard specification and may optionally be provided with at least one optional component or device in addition to the standard specification, such as a module constructed by adding one shaft to the standard specification upon request from a customer.

[Module of Standard Specification]

FIG. 1 is a plan view illustrating a schematic structure of a module 2 of the standard specification. FIG. 2 is a schematic view of the II-II cross section of FIG. 1. Note that FIG. 2 illustrates a servomotor 81 with a two-dotted chain line. As illustrated in FIGS. 1 and 2, the module 2 of the standard specification of one embodiment of the present invention is typically comprised of a link member 30, a first shaft 31 (support member) having a first axis L1 passing through its axis, a bearing 32 for rotatably coupling the link member 30 to the first shaft 31, and a first drive unit 33 for rotating the link member 30 about the first axis L1 with respect to the first shaft 31. Desirably, the link member 30 is rotatable 360° about the first axis L1.

The link member 30 is a hollow box body elongated in a horizontal direction and has an outer shape as a link which is an element of the articulated robot. The link member 30 is comprised of a plurality of members including a main body 30a and a lid body 30b joined to the main body 30a by, for example, a fastener. The link member 30 is capable of opening the space inside by removing the lid body 30b, and thus, works, for example, attaching interior components, such as the first drive unit 33, and wiring, are performed on the link member 30 inside of which space is opened as described above.

The link member 30 is formed with open sections 30c in upper and lower surfaces, at both of a base end portion and a tip end portion. Supporting portions 30d and 30e for supporting the first shaft 31 of another module 2 or rotatably supporting a second shaft 41 (described later) are defined around the open sections 30c. Each of the supporting portions 30d and 30e is formed with a plurality of fastening holes (not illustrated) used for fasteners to fasten the first shaft 31 etc. of the other module 2 to the supporting portions 30d and 30e. In order to provide strength to the supporting portions 30d and 30e, the supporting portions 30d and 30e are desirably formed thicker than other parts of the link member 30, or reinforcing plates are provided to the supporting portions 30d and 30e.

An upper part 312 of the first shaft 31 is inserted into the open section 30c formed in the lower surface at the base end portion of the link member 30. The first shaft 31 functions as a support member for supporting the link member 30. The first shaft 31 is integrally formed or configured to be dividable. The first shaft 31 of this embodiment is formed by joining a lower part 311 projecting outside the link member 30 to the upper part 312 inserted into the link member 30, so that they are arranged in line in an extending direction of the first axis L1. The lower part 311 of the first shaft 31 also has a function as a spacer between the modules 2 coupled to each other. A gear 313 is fitted and fixed onto the upper part 312 of the first shaft 31.

The first shaft 31 is shaped into a hollow shaft as a whole, and a bush 315 is inserted into the hollow section. An inner circumferential side of the bush 315 is used as space for wiring and piping. Although the bush 315 of this embodiment has a uniform inner diameter, the bush 315 may be a hollow-shaft-shaped body having an upper portion of which inner diameter gradually enlarges upwardly in a so-called trumpet shape. As a result, friction of the wiring and piping with the bush 315 is reduced, which prevents damages of the wiring and piping.

The first drive unit 33 is provided inside the link member 30. The first drive unit 33 typically includes the servomotor 81 as a driving source, and a power transmission mechanism 83 for transmitting an output of the servomotor 81 to the gear 313 of the first shaft 31 via an output gear 82 meshed with the gear 313 of the first shaft 31. The output gear 82 is fixed to or integrally formed with an output shaft 84 rotatably supported by the link member 30. The power transmission mechanism 83 is comprised of a plurality of gears and also has a function as a gear-reduction mechanism for reducing the rotational speed of the motor output and outputting it to the output gear 82. Note that, operation of the first drive unit 33 is controlled by a controller (not illustrated), and cables connecting the first drive unit 33 with the controller pass through the link member 30 and the first shaft 31.

[Module of Optional Specification]

In the module 2 of the standard specification having the above configuration, the second shaft 41 (shaft member) is optionally addable to the tip end portion.

Hereinafter, when distinguishing the module of the optional specification particularly from the module 2 of the standard specification, the reference character "2A" may be used for the module of the optional specification. FIG. 3 is a plan view illustrating a schematic structure of the module 2A of the optional specification. FIG. 4 is a schematic view of the Iv-Iv cross section of FIG. 3. Note that FIG. 4 illustrates the servomotor 81 with a two-dotted chain line.

As illustrated in FIGS. 3 and 4, in the module 2A of the optional specification, the second shaft 41 is added to the module 2 of the standard specification described above. Specifically, the optional specification module 2A includes the structure of the standard specification module 2 and also the second shaft 41 inserted into the link member 30, a bearing 42 rotatably coupling the second shaft 41 to the link member 30, and a second drive unit 43 for rotating the second shaft 41 about a second axis L2 passing through the axis of the second shaft 41 with respect to the link member 30. Note that, the first axis L1 and the second axis L2 are parallel to each other, and the first and second axes L1 and L2 of this embodiment extend vertically.

The second shaft 41 is inserted into the open section 30c formed in the upper surface of the tip end portion of the link member 30 and rotatably supported by the supporting portion 30e defined in the circumferential edge portion of the open section 30c via the bearing 42. Desirably, the second shaft 41 is rotatable 360° about the second axis L2 with respect to the link member 30.

The second shaft 41 is integrally formed or configured to be dividable. In this embodiment, the second shaft 41 is formed by joining a part 411 projecting outside the link member 30 to a part 412 inserted into the link member 30, so that they are arranged in line in the extending direction of the axis of the second shaft 41. A gear 413 is fitted and fixed onto the part 412 inserted into the link member 30 of the second shaft 41. The second shaft 41 is substantially a hollow shaft as a whole, and a bush 415 is inserted into the hollow section. An inner circumferential side of the bush 415 is used as space for wiring and piping.

The part 411 projecting outside the link member 30 of the second shaft 41 may be coupled to another link member, for example. In this embodiment, a base end portion of a flat-plate-shaped link member 51 is fixed to the part 411 projecting outside the link member 30 of the second shaft 41. This link member 51 behaves integrally with the second shaft 41 and is driven by the second drive unit 43 to rotate about the second axis L2.

The second drive unit 43 is provided inside the link member 30. Note that, in the module 2A of this embodiment, a space used to dispose the second drive unit 43 is defined inside the link member 30 in advance, so as to facilitate customization. The second drive unit 43 has substantially the same configuration as the first drive unit 33. The same reference characters are provided to the members of the first drive unit 33 and the second drive unit 43 having the common functions. The second drive unit 43 typically includes a servomotor 81 as a driving source, and a power transmission mechanism 83 for transmitting an output of the servomotor 81 to the gear 413 of the second shaft 41 via an output gear 82 meshed with the gear 413 of the second shaft 41.

Although in the module 2A having the above structure, the second shaft 41 projects upward from the upper surface of the link member 30, the module 2A may be modified so that the second shaft 41 projects downward from the lower surface of the link member 30. Hereinafter, when distinguishing a modification of the module 2A of the optional specification particularly from the module 2 of the standard specification and the module 2A of the optional specification, the reference character "2A'" may be used for the modification of the module of the optional specification. FIG. 5 illustrates a side cross-sectional view of the modification (module 2A') of the module 2A of the optional specification illustrated in FIG. 3.

In the module 2A' of the optional specification illustrated in FIG. 5, the second shaft 41 is inserted into the open section 30c formed in the lower surface at the tip end side of the link member 30, and rotatably supported by the supporting portion 30e defined around the open section 30c via the bearing 42. The gear 413 is fitted and fixed onto an upper part of the second shaft located inside the link member 30, and this gear 413 is meshed with the output gear 82 of the second drive unit 43. Further, another link member 51 is fixed to a lower part of the second shaft 41 so as to project downward from the lower surface of the link member 30. Therefore, in the module 2A' having such a structure, the other link member 51 is coupled to the lower side of the module 2A.

As described above, the module 2 of this embodiment includes the first shaft 31 (support member), the link member 30 supported by the first shaft 31 to be rotatable about the first axis L1, the first drive unit 33 provided in the link member 30 and for rotating the link member 30 about the first axis L1 with respect to the first shaft 31.

The module 2 of this embodiment is couplable to another module having substantially the same configuration as the module 2. The link member 30 of the module 2 is defined with the supporting portion 30d for supporting the first shaft 31 of the other module so that the first axes L1 substantially match with each other, and the supporting portions 30e for supporting the first shaft 31 of the other module while avoiding the first axes L1 from substantially matching with each other. Although in the module 2 of this embodiment, both of the supporting portions 30d and 30e are defined in the link member 30 so as to facilitate customization, at least one of these portions may be defined. Note that in the above description, "another module having substantially the same configuration" is not limited to the module 2 of the standard specification, but also includes modules which include the first shaft 31, the link member 30, and the first drive unit 33 as a basic structure. For example, the other module described above broadly includes modules, such as a module which is the module 2 of the standard specification additionally provided with at least one optional component or device, and a module which is the module 2 of the standard specification of which shape of at least a part of the link member 30 or the first shaft 31 of the module 2 of the standard specification is changed.

As described above, the module 2 of this embodiment is provided with the first shaft 31, the link member 30, and the first drive unit 33 as a structural unit of the articulated robot, and they can be treated as a single assembly. The articulated robot may be constructed by combining one module 2 with another link member 51 or combining two or more modules 2 with each other as needed. Since the articulated robot is formed by the module 2, by changing the number of the modules 2 or replacing it with a module 2 of a different specification, a customized articulated robot upon a request from a user can easily be provided.

Further, in the module 2 of this embodiment, the first drive unit 33 includes the first gear 313 provided to the first shaft 31, the servomotor 81, and the power transmission mechanism 83 including the second gear 82 meshed with the first gear 313 and for transmitting the output of the servomotor 81 to the first gear 313 via the second gear 82.

In the first drive unit 33 having the above structure, when the second gear 82 is rotated by the power transmitted from the servomotor 81, the second gear 82 rotates around the first gear 313. Thus, the link member 30 supporting the second gear 82 rotates about the first axis L1 with respect to the first shaft 31. Since the link member 30 is configured to rotate around the first shaft 31 as described above, the module 2 can be rotated about the first axis L1 without interference of the other module 2 to which the module 2 is coupled. Further, the module 2 can be treated as an assembly of the link member 30, the first shaft 31, and the first drive unit 33.

Further, each of the modules 2A and 2A of the optional specifications of this embodiment also includes the second shaft 41 (shaft member) supported by the link member 30 to be rotatable about the second axis L2 which is parallel to the first axis L1, and the second drive unit 43 provided in the link member 30 and for rotating the second shaft 41 about the second axis L2 with respect to the link member 30.

As described above, the module 2 of this embodiment may be configured as a module integrally provided with the two shafts (i.e., the first shaft 31 and the second shaft 41) and the drive units thereof (i.e., the first drive unit 33 and the second drive unit 43), which widens the variation of the articulated robot which can be constructed by combining such modules 2. Further in this module 2, since the two shafts and the drive units thereof are supported by a single link member 30, a drive unit used for rotation around the second shaft 41 can be omitted from another link coupled downstream of this link member 30. Thus, a thin and long link member which is not mounted with a drive unit, a link member having low rigidity, etc. may be adopted as another link coupled to the downstream side.

[Structural Example of Articulated Robot]

Hereinafter, structural examples of the articulated robot using the module 2 are described.

[First Embodiment of Articulated Robot]

Figure 6:
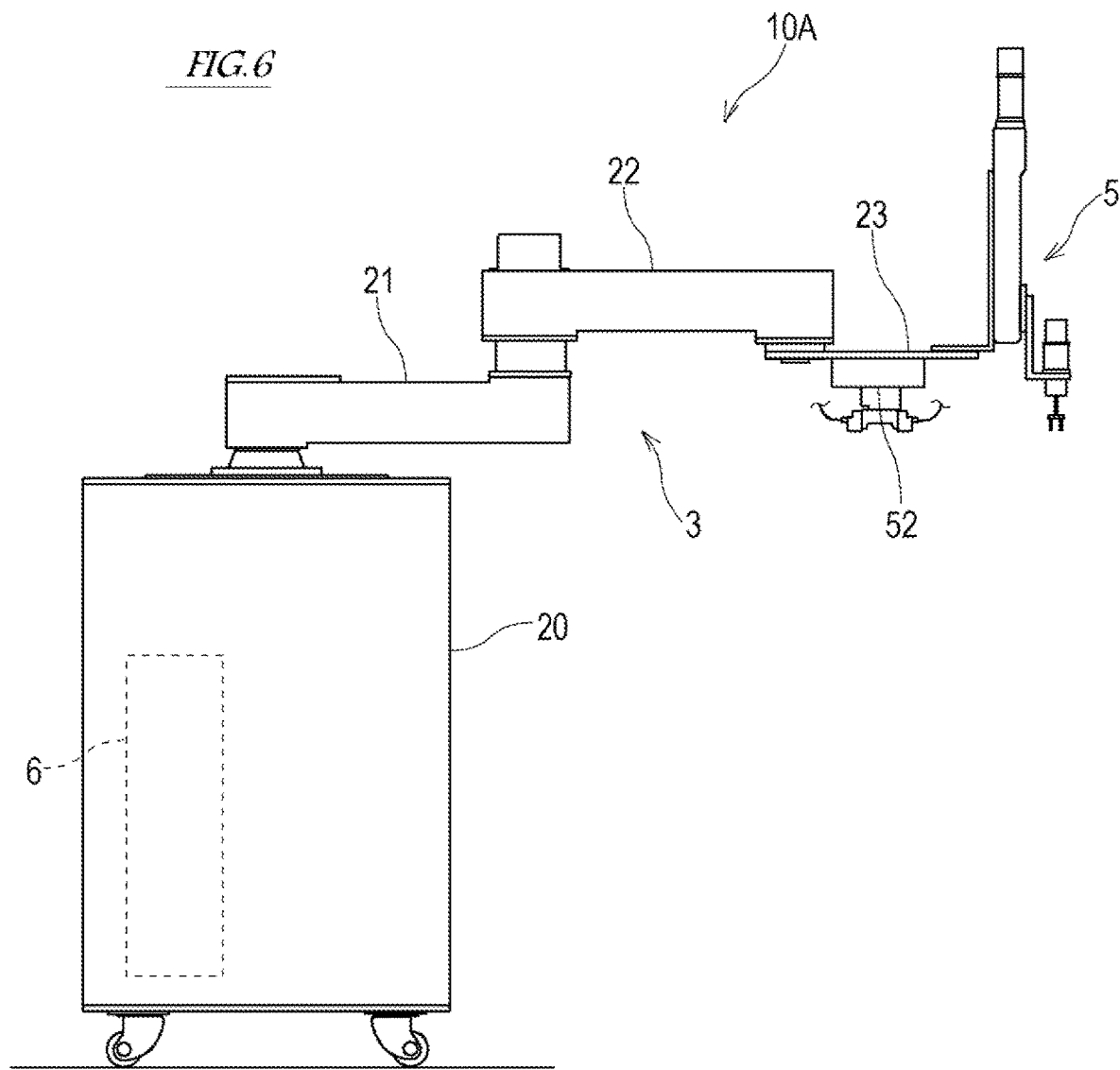
FIG. 6 is a side view illustrating a schematic structure of an articulated robot according to a first embodiment of the present invention.

FIG. 6 is a side view illustrating a schematic structure of an articulated robot 10A according to a first embodiment of the present invention. As illustrated in FIG. 6, the articulated robot 10A of the first embodiment of the present invention includes a pedestal 20, a robotic arm 3 supported by the pedestal 20, a robotic hand 5 attached to a wrist of the robotic arm 3, and a controller 6 for controlling operations of the robotic arm 3 and the robotic hand 5. The robotic arm 3 includes a first link 21 coupled to the pedestal 20 to be rotatable in horizontal directions, a second link 22 coupled to a tip end part of the first link 21 to be rotatable in horizontal directions, and a third link 23 coupled to a tip end part of the second link 22 to be rotatable in horizontal directions.

Figure 7:
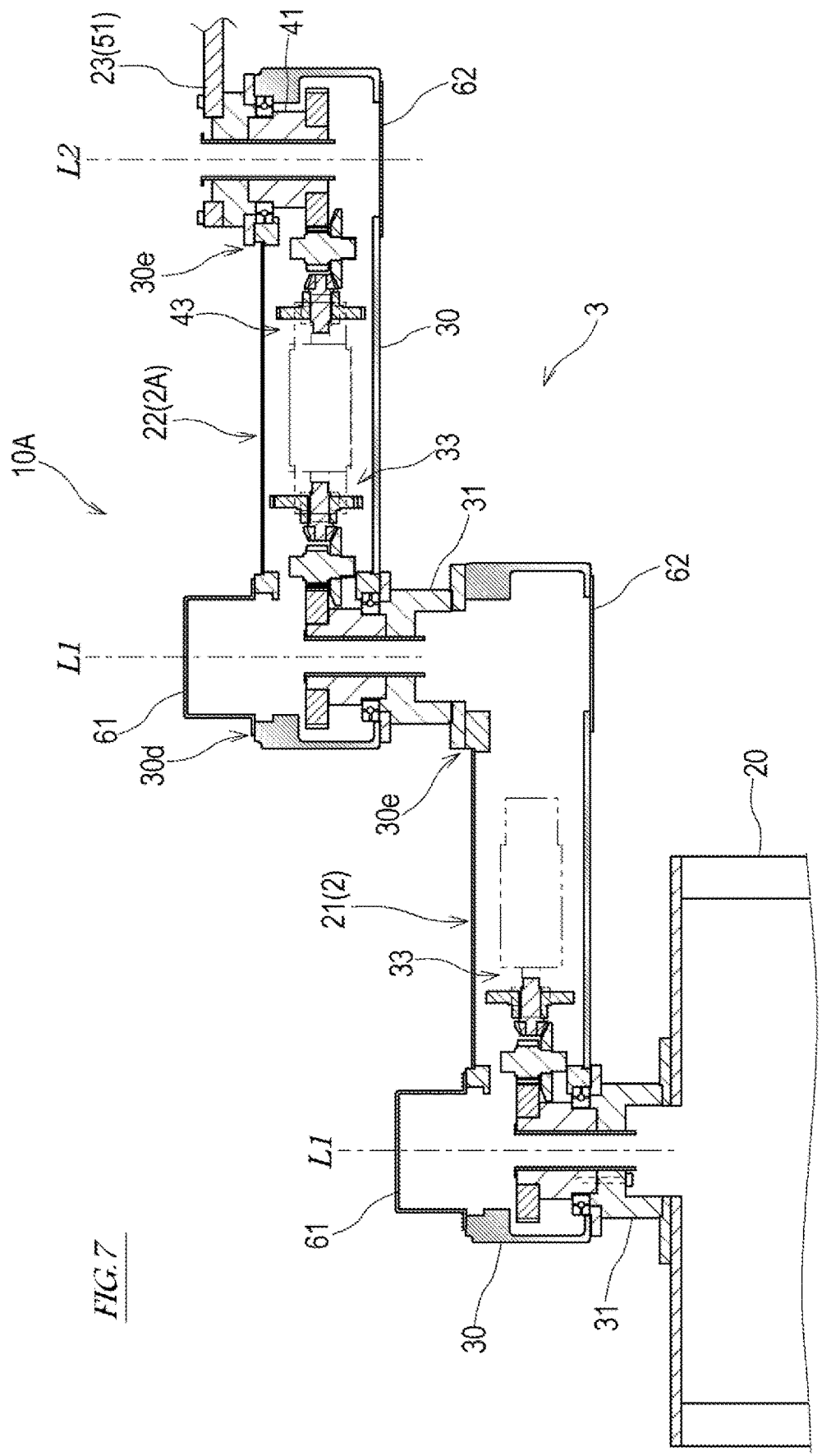
FIG. 7 is a side cross-sectional view illustrating one example of a module formation in the articulated robot according to the first embodiment.

FIG. 7 is a side cross-sectional view illustrating one example of a module formation in the articulated robot 10A of the first embodiment. The robotic arm 3 of the articulated robot 10A illustrated in FIG. 7 is formed by coupling the module 2 of the standard specification as the first link 21, the module 2A of the optional specification as the second link 22, and the flat-plate-shaped link member 51 as the third link 23 to each other in series.

A lower end of the first shaft 31 of the module 2 of the first link 21 is fixed to the pedestal 20. A lower end of the first shaft 31 of the module 2A of the second link 22 is fixed to the tip end side of an upper surface of the link member 30 of the module 2 of the first link 21. A base end portion of the link member 51 of the third link 23 is fixed to the second shaft 41 of the module 2A of the second link 22.

In each of the module 2 of the first link 21 and the module 2A of the second link 22, the opening of the upper surface of the link member 30 on the base end side is closed by a hat-shaped cap 61. The space inside each link member 30 extended upward by the cap 61 is used for wiring and piping. Additionally, in each of the module 2 of the first link 21 and the module 2A of the second link 22, the opening of the lower surface of the link member 30 on the tip end side is closed by a circular closing plate 62.

An opening formed in the upper surface of the pedestal 20 and the bush 31s of the first shaft 31 of the module 2 provided to stand from the opening communicate the inside of the module 2 of the first link 21 with the inside of the pedestal 20. Further, the open section 30c at the tip end portion of the link member 30 of the module 2 and the bush 31s of the first shaft 31 of the module 2A provided to stand from this open section 30c communicate the inside of the module 2 of the first link 21 with the inside of the module 2A of the second link 22. Thus, the spaces inside the pedestal 20, the first link 21, and the second link 22 are communicated with each other, and these spaces are used for wiring and piping. The link member 51 is provided with a wiring base 52 passing through the first link 21 and the second link 22 from the pedestal 20 and for bundling the wiring and piping pulled out from the tip end portion of the second link 22.

In the robotic arm 3 having the above structure, the module 2 of the standard specification is used as the first link 21; however, the module 2A of the optional specification may be used instead of the module 2 of the standard specification. Here, a modification of the module formation of the articulated robot 10A of the first embodiment when the module 2A of the optional specification is used as the first link 21 is described.

Figure 8:
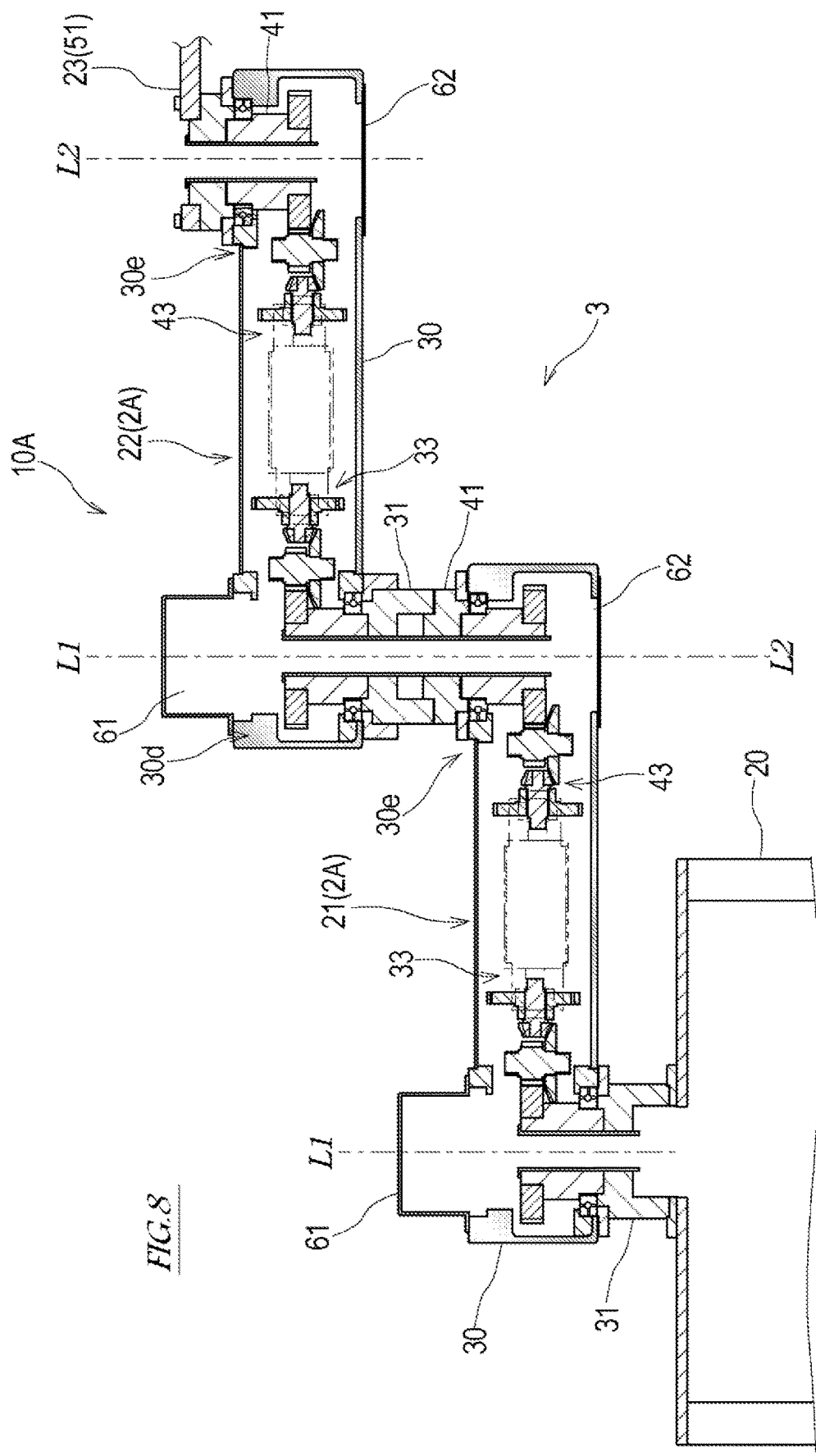
FIG. 8 is a side cross-sectional view illustrating one modification of the module formation in the articulated robot according to the first embodiment.

FIG. 8 is a side cross-sectional view illustrating one modification of the module formation in the articulated robot according to the first embodiment. The robotic arm 3 of the articulated robot 10A illustrated in FIG. 8 is formed by coupling the module 2A of the optional specification as the first link 21, the module 2A of the optional specification as the second link 22, and another link member 51 as the third link member 23 to each other in series.

A lower end of the first shaft 31 of the module 2A of the first link 21 is fixed to the pedestal 20. An upper end of the second shaft 41 of the module 2A of the first link 21 is coupled to a lower end of the first shaft 31 of the module 2A of the second link 22. The base end portion of the link member 51 of the third link 23 is fixed to an upper end of the second shaft 41 of the module 2A of the second link 22.

In the robotic arm 3 to which the modules 2A of the optional specification are coupled in series as in the above modification, although a joint coupling the first link 21 to the pedestal 20 is moved by the output from a single drive unit 33, the joint coupling the first link 21 to the second link 22 is moved by the combined output of the two drive units 33 and 43. A quicker motion may be required to the joint closer to a terminal end of the robotic arm 3, and the structure of this modification is advantageous in such a case.

As described above, the articulated robot 10A of this embodiment includes the pedestal 20 and two or more modules 2 supported by the pedestal 20. Each of the two or more modules 2 includes the first shaft 31 (support member), the link member 30 supported by the first shaft 31 to be rotatable about the first axis L1, and the first drive unit 33 provided in the link member 30 and for rotating the link member 30 about the first axis L1 with respect to the first shaft 31.

The two or more modules 2 are arranged in the extending directions of the first axes L1 while avoiding the first axes L1 from substantially matching with each other. Thus, the robotic arm 3 of the articulated robot 10A is constructed using the two or more modules 2.

In this embodiment, the two or more modules 2 include a first module (i.e., the module 2 of the first link 21) having the first shaft 31 fixed to the pedestal 20, and a second module (i.e., the module 2 of the second link 22) having the first shaft 31 fixed to the link member of another module (i.e., the link member 30 of the first link 21). Note that at the tip end side of this second module, another second module having a first shaft 31 fixed to the link member 30 of the second module may be provided. In other words, the robotic arm 3 may include a plurality of modules 2 disposed repeatedly in series.

[Second Embodiment of Articulated Robot]

Figure 9:
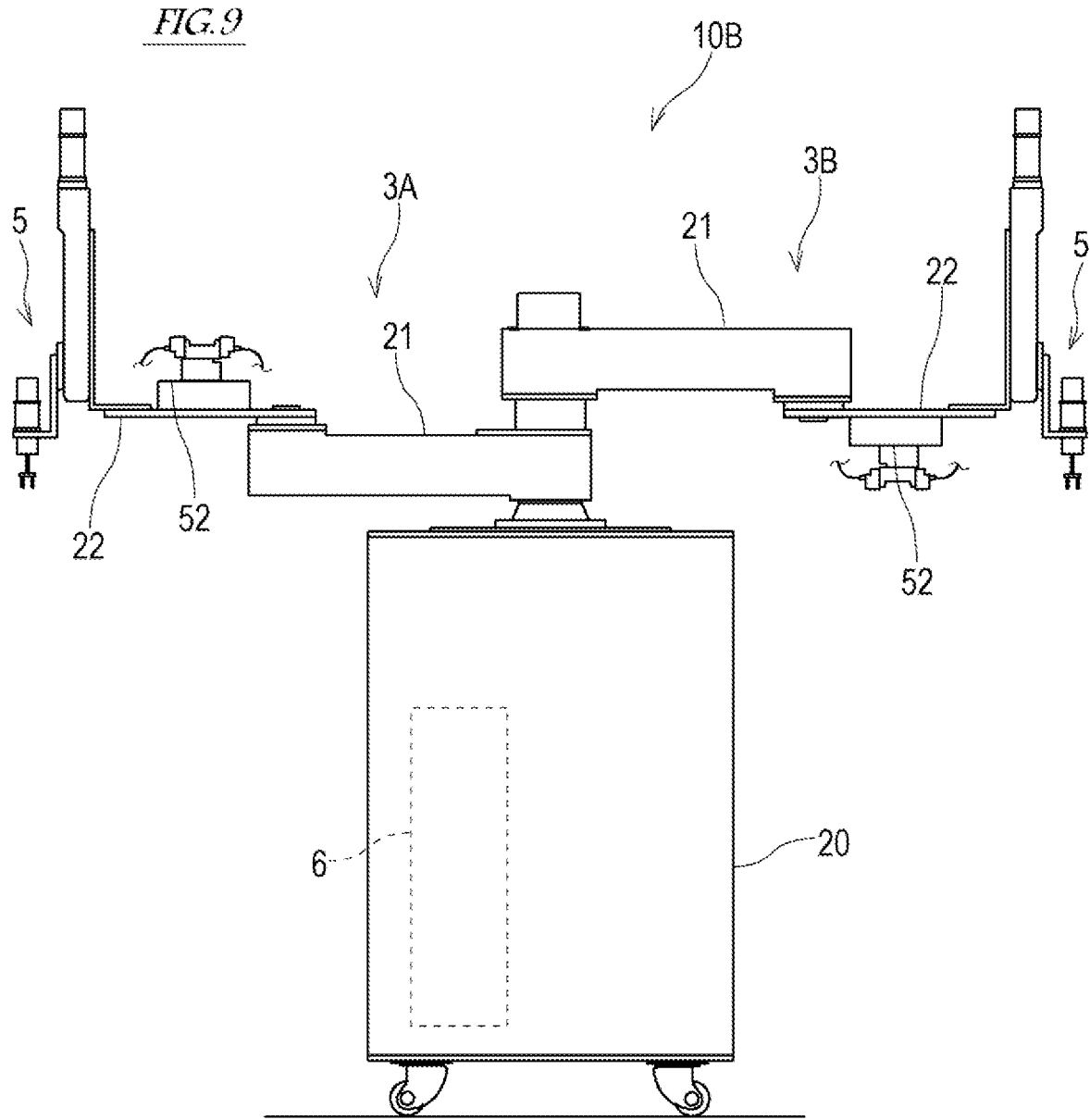
FIG. 9 is a side view illustrating a schematic structure of an articulated robot according to a second embodiment of the present invention.
Figure 10:
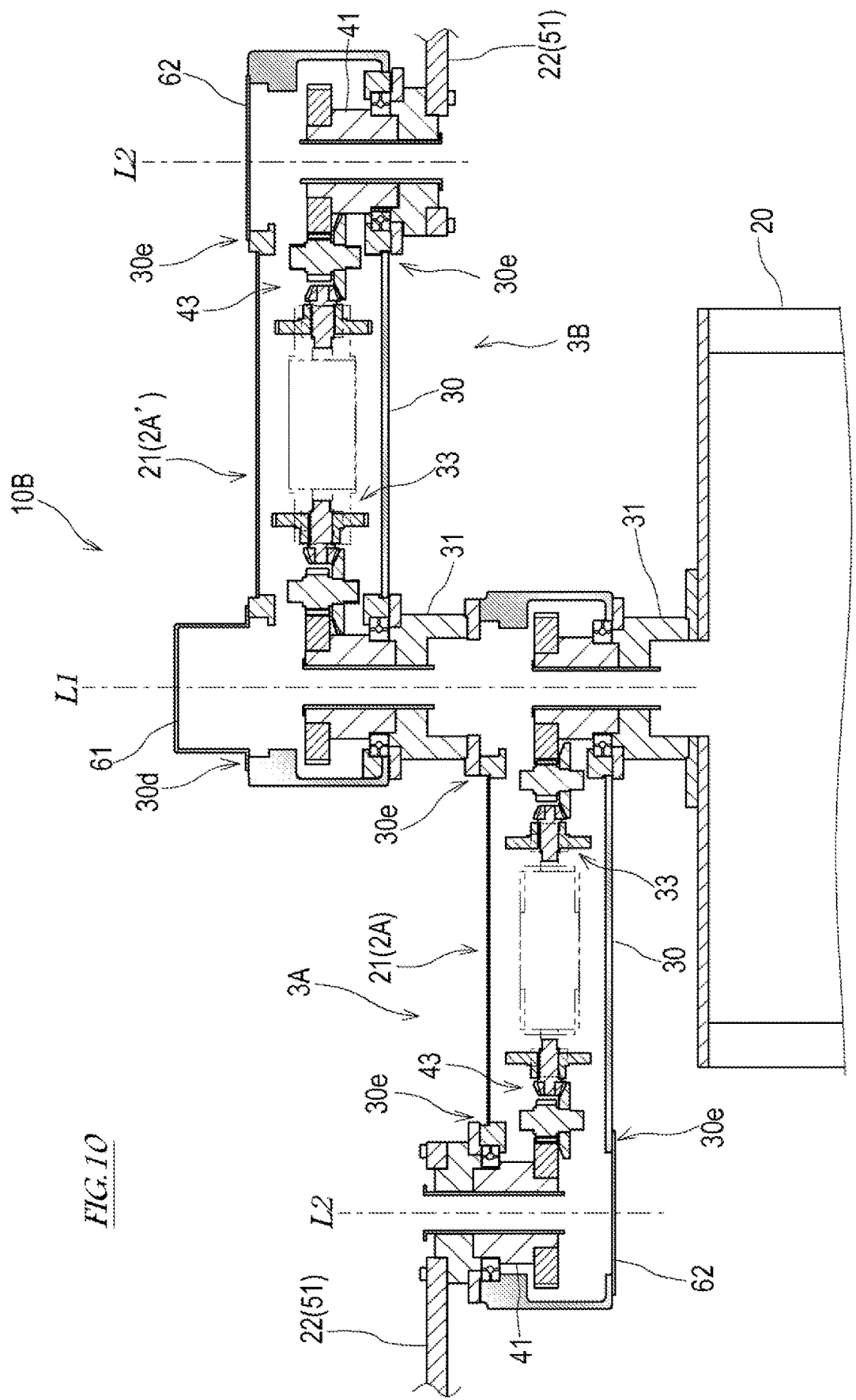
FIG. 10 is a side cross-sectional view illustrating one example of a module formation in the articulated robot according to the second embodiment.
Figure 11:
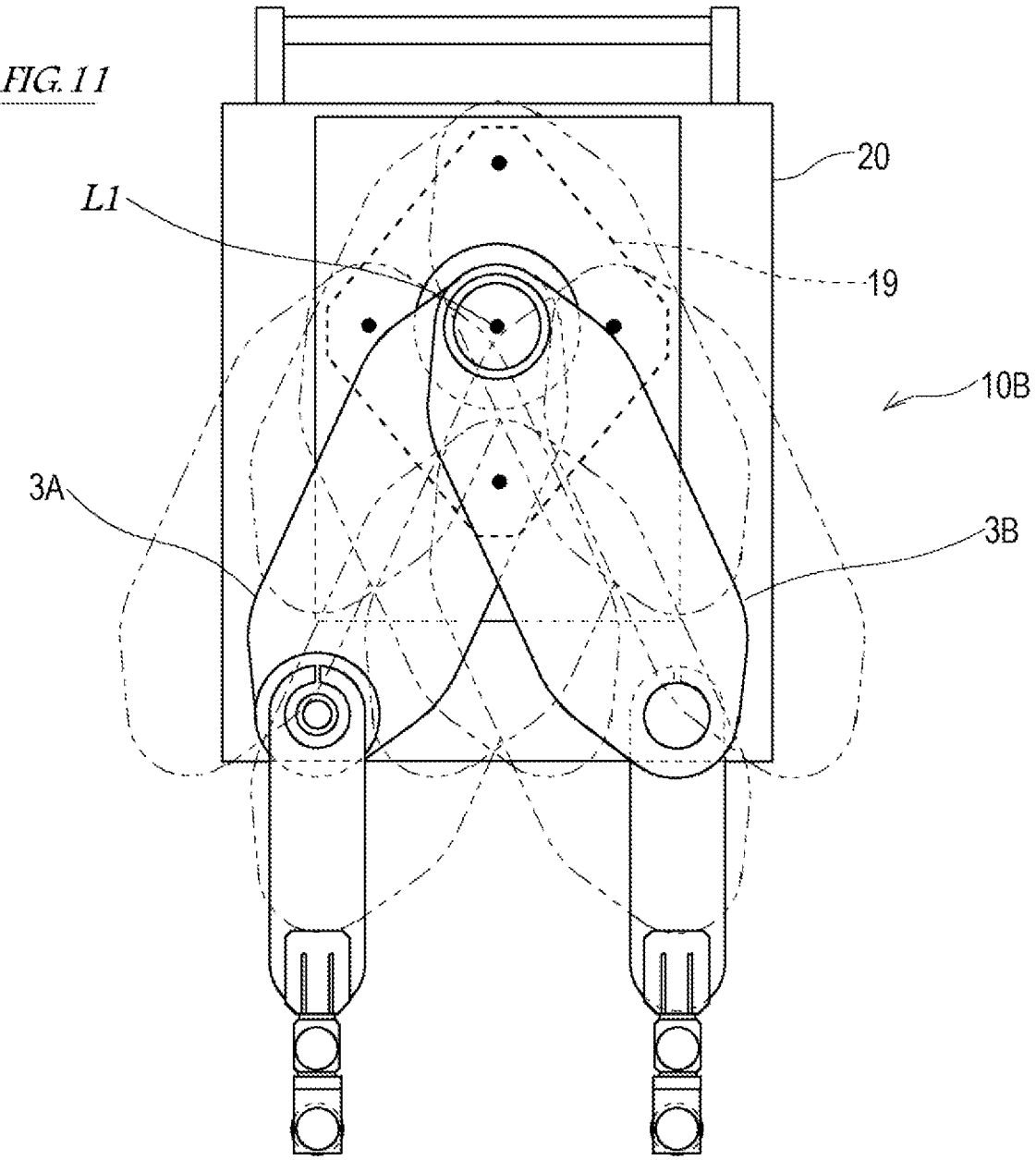
FIG. 11 is a plan view illustrating the schematic structure of the articulated robot according to the second embodiment.

Next, an articulated robot 10B according to a second embodiment of the present invention is described. FIG. 9 is a side view illustrating a schematic structure of the articulated robot 10B of the second embodiment of the present invention. FIG. 10 is a side cross-sectional view illustrating one example of a module formation in the articulated robot 10B of the second embodiment. FIG. 11 is a plan view illustrating the schematic structure of the articulated robot 10B of the second embodiment. Note that, in the description of this embodiment, the same as or similar members to those in the first embodiment described above are denoted with the same reference characters, and the description thereof may be omitted.

The articulated robot 10B illustrated in FIGS. 9 and 10 includes a pedestal 20, two robotic arms 3A and 3B supported by the pedestal 20, robotic hands 5 attached to wrists of the respective robotic arms 3A and 3B, respectively, and a controller 6 for controlling operations of the robotic arms 3A and 3B and the robotic hand 5.

The two robotic arms 3A and 3B have a common structure, and each of the two robotic arms 3A and 3B includes a first link 21 and a second link 22 coupled to a tip end portion of the first link 21. Base end portions of the first links 21 of the two robotic arms 3A and 3B are disposed on the same axis and the first link 21 of one robotic arm 3A and the first link 21 of the other robotic arm 3 are disposed at different positions in height. Hereinafter, one of the two robotic arms which is located lower than the other is referred to as the first arm 3A and the other robotic arm located higher is referred to as the second arm 3B.

In the first arm 3A, a module 2A of the optional specification is used as the first link 21 and a flat-plate-shaped link member 51 is used as the second link 22. A lower end of a first shaft 31 of the module 2A of the first link 21 is fixed to the pedestal 20. Note that as illustrated in FIG. 11, a rhomboid opening 19 is formed in an upper surface of the pedestal 20, and the attaching position of the first shaft 31 with respect to the pedestal 20 within the range of this opening 19 is changeable. In other words, the position of the first axis L1 of the module 2A of the first link may be selected within the range of the opening 19. A base end portion of a link member 51 of the third link 23 is fixed to a second shaft 41 of the module 2A of the first link 21.

In the second arm 3B, a module 2A of the optional specification is used as the first link 21 and a flat-plate-shaped link member 51 is used as the second link 22. A lower end of a first shaft 31 of the module 2A' of the first link 21 is fixed to a link member 30 of the module 2A of the first link 21 of the first arm 3A. A base end portion of the link member 51 of the third link 23 is fixed to a second shaft 41 of the module 2A' of the first link 21.

In the articulated robot 10B having the above structure, the first shaft 31 of the first link 21 of the second arm 3B is fixed to the link member 30 of the first link 21 of the first arm 3A. In other words, the articulated robot 10B includes the module 2 having the first axis 31 fixed to the link member 30 of another module 2. In such an articulated robot 10B, when the first arm 3A rotates about the first axis L1, the second arm 3B also rotates about the first axis L1 accompanying this movement. Therefore, a control signal supplied from the controller 6 to a first drive unit 33 of the second arm 3B contains a component which cancels the rotation of the first arm 3A about the first axis L1. For example, in order to rotate the first arm 3A by 90° about the first axis L1 and seemingly stop the rotation of the second arm 3B, the first arm 3A is rotated by 90° about the first axis L1 and the second arm 3B is rotated by −90° about the first axis L1.

Figure 12:
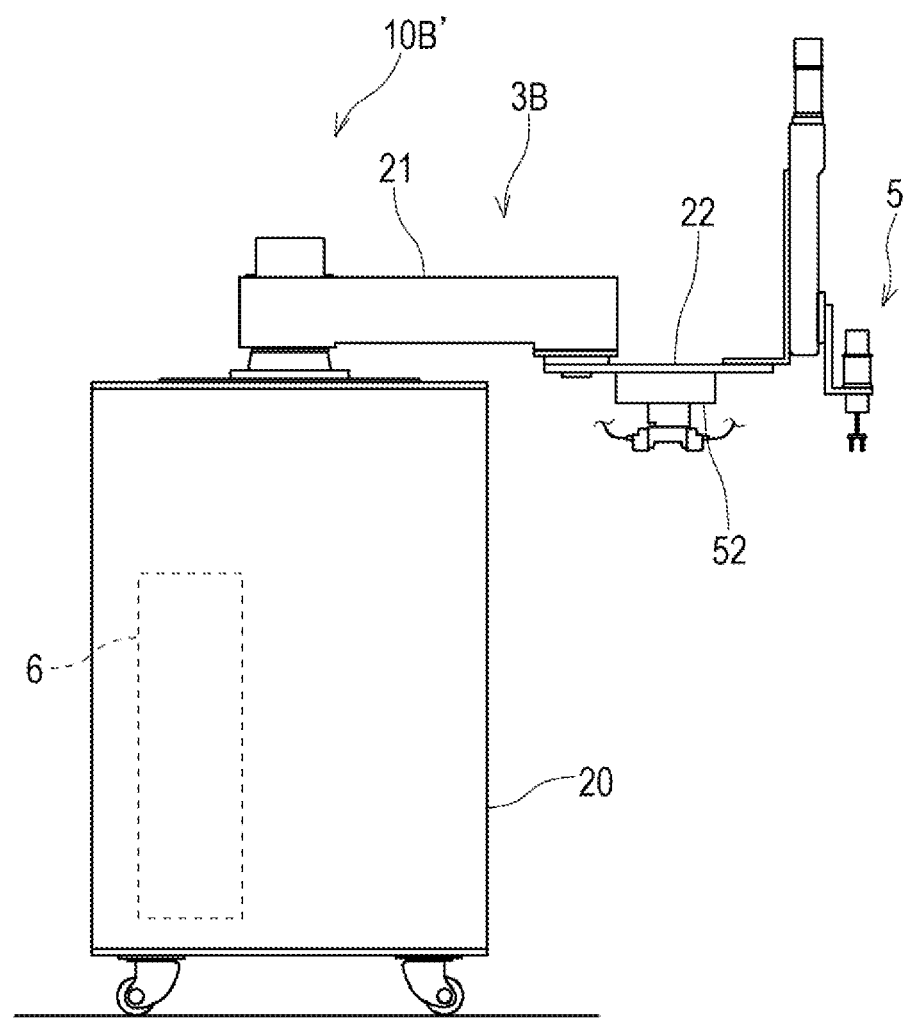
FIG. 12 is a side cross-sectional view illustrating one modification in the articulated robot according to the second embodiment.

In the articulated robot 10B having the above configuration, since the two arms are formed by simply coupling base end parts of the two robotic arms 3A and 3B vertically, customizations, such as forming a further larger number of arms by increasing the number of robotic arms 3, or forming a single arm by reducing the number of robotic arms 3, are easily performable. For example, FIG. 12 illustrates an articulated robot 10B' formed by removing one of the two robotic arms 3A and 3B of the articulated robot 10B illustrated in FIG. 9. The articulated robot 10B' includes a pedestal 20 and the second arm 3B supported by the pedestal 20. The articulated robot 10B' may include the first arm 3A instead of the second arm 3B.

As described above, the articulated robot 10B of this embodiment includes the pedestal 20 and the two or more modules 2 supported by the pedestal 20. Each of the two or more modules 2 includes the first shaft 31 (support member), the link member 30 supported by the first shaft 31 to be rotatable about the first axis L1, and the first drive unit 33 provided in the link member 30 and for rotating the link member 30 about the first axis L1 with respect to the first shaft 31.

The two or more modules 2 are arranged in the extending directions of the first axes L1 so that the first axes L1 substantially match with each other. Thus, the dual-arm articulated robot 10B is configured using the two or more modules 2.

In this embodiment, the two modules 2 are disposed at different positions in height so that the first axes L1 substantially match with each other; however, three or more modules 2 may be disposed at different positions in height so that the first axes L1 substantially match with each other.

In the articulated robot 10B of this embodiment, each of the robotic arms 3A and 3B is formed by the single module 2 and the link member 51; however, at least one of the robotic arms 3A and 3B may be formed including a plurality of modules 2. In this case, at least one of the robotic arms 3A and 3B may be formed with, for example, one module 2 as the first link, another module 2 as the second link, and the flat-plate-shaped link member 51 as the third link.

From the above description of the preferred embodiments and modifications of the present invention, it is apparent for a person skilled in the art that many improvements and other embodiments of the present invention are possible. Therefore, the above description is to be interpreted only as illustrations, and is only provided in order to teach the person skilled in the art a best mode to implement the present invention. Details of the structures and/or the functions may substantially be changed, without departing from the spirit of the present invention.

DESCRIPTION OF REFERENCE CHARACTERS

2: Module
3: Robotic Arm
5: Robotic Hand
6: Controller
10A, 10 B: Articulated Robot
20: Pedestal
21: First Link
22: Second Link
30: Link Member
31: First Shaft (Support Member)
32: Bearing
33: First Drive Unit
41: Second Shaft (Shaft Member)
42: Bearing
43: Second Drive Unit
51: Link Member
52: Wiring Base
L1: First Axis
L2: Second Axis

What is claimed is:

1. An articulated robot, comprising:
a pedestal; and
a plurality of modules including a first module supported by the pedestal and a second module coupled to the first module, each of the plurality of modules including:
(a) a link member having a first axis defined at a base end portion and a second axis defined at a tip end portion, the link member having, on each of an upper surface and a lower surface, an open section through which the first axis passes and another open section through which the second axis passes,
(b) a support member that supports the link member to rotate about the first axis, and
(c) a first drive unit provided inside the link member and being configured to rotate the link member about the first axis with respect to the support member,
wherein:
the first module and the second module are arranged in extending directions of the first axes of each of the first module and the second module, and the support member of the second module is fastened to a supporting portion provided on a peripheral edge of one of the open sections on the upper surface of the first module,
the second module has a shaft member supported by the link member of the second module via a bearing so as to project from one of the open sections on the upper surface and the lower surface through which the second axis passes, and
the second module includes a second drive unit provided in the link member of the second module, the second drive unit being configured to rotate the shaft member about the second axis with respect to the link member of the second module, and the first drive unit of the second module and the second drive unit of the second module are configured to operate independently from each other.

2. The articulated robot of claim 1, wherein the first axis of the first module and the first axis of the second module substantially match with each other.

3. The articulated robot of claim 1, wherein the first axis of the first module and the first axis of the second module do not match with each other.

4. The articulated robot of claim 1, wherein the first drive unit includes a first gear provided to the support member, a servomotor, and a power transmission mechanism including a second gear meshed with the first gear and for transmitting an output of the servomotor to the first gear via the second gear.

\* \* \* \* \*